(12) United States Patent
Stewart, III et al.

(10) Patent No.: US 6,393,812 B1
(45) Date of Patent: May 28, 2002

(54) METHOD AND APPARATUS FOR GATHERING, TRANSPORTING, AND PROCESSING AQUATIC PLANTS

(75) Inventors: E. Allen Stewart, III, Punta Gorda, FL (US); Sam Morgan, Menlo, KS (US); Mark J. Zivojnovich, Ocala, FL (US)

(73) Assignee: Hydromentia, Inc., Ocala, FL (US)

( * ) Notice: Subject to any disclaimer, the term of this patent is extended or adjusted under 35 U.S.C. 154(b) by 0 days.

(21) Appl. No.: 09/702,709

(22) Filed: Oct. 31, 2000

(51) Int. Cl.[7] .............................................. A01D 44/00
(52) U.S. Cl. .............................................................. 56/9
(58) Field of Search ............................ 56/1, 8, 9, 16.6, 56/12.2, 514, 414.5; 37/326, 329, 393; 172/122, 123, 125; 119/3, 215, 216, 217–226

(56) References Cited

U.S. PATENT DOCUMENTS

| | | | |
|---|---|---|---|
| 4,248,033 A | 2/1981 | Bryant | 56/8 |
| 4,258,534 A | 3/1981 | Bryant | 56/9 |
| 4,333,263 A | 6/1982 | Adey | 47/1.4 |
| 4,520,616 A | 6/1985 | Stewart, III et al. | 56/9 |
| 4,638,621 A | 1/1987 | Stewart, III et al. | 56/9 |
| 4,966,096 A | 10/1990 | Adey | 119/3 |
| 5,069,023 A | 12/1991 | Prochaska, Sr. et al. | 56/9 |
| 5,097,795 A | 3/1992 | Adey | 119/3 |
| 5,481,856 A | 1/1996 | Wickoren et al. | 56/9 |
| 5,487,258 A | 1/1996 | McNabb | 56/9 |
| 5,603,204 A | 2/1997 | Harvey-Rioux et al. | 56/9 |
| 5,715,774 A | 2/1998 | Adey et al. | 119/230 |
| 5,778,823 A | 7/1998 | Adey et al. | 119/215 |
| 5,811,007 A | 9/1998 | Stewart et al. | 210/602 |
| 5,820,759 A | 10/1998 | Stewart et al. | 210/602 |
| 5,851,398 A | 12/1998 | Adey | 210/602 |

OTHER PUBLICATIONS

U.S. Army Corps of Engineers, Jacksonville District, "Aquatic Plant Control Program" website www.saj.usace, army.mil/comops/sap/new_folder/timeline.htm (Aug. 21, 2000).

*Primary Examiner*—Robert E. Pezzuto
(74) *Attorney, Agent, or Firm*—Holland & Knight LLP (57) ABSTRACT

An apparatus and method for removing water hyacinths. The system of the present invention utilizes a transfer mechanism and grapple to collect hyacinth material from a body of water. The collected material is then passed to a transport for delivery to a header unit and grapple. The header unit grapple then retrieves the hyacinth material and delivers it to a collection bin for processing. The chopped hyacinth material is thereafter discharged for subsequent use as a biomass.

2 Claims, 6 Drawing Sheets

METHOD AND APPARATUS FOR GATHERING, TRANSPORTING, AND PROCESSING AQUATIC PLANTS

BACKGROUND OF THE INVENTION

1. Field of the Invention

This invention relates to systems for managing plant material. More specifically, the present invention relates to a system for gathering, transporting, and processing vascular aquatic plants, particularly water hyacinths.

2. Description of the Background Art

The management and processing of vascular aquatic plants is of increasing importance in the fields of aquaculture, and aquatic plant water treatment technologies. In addition to occurring in fresh water bodies of water, vascular aquatic plants such as water hyacinth may be a component of an integrated aquaculture and bioremediation system or a cultivatable stand alone crop. The ability to effectively manage and harvest biomass associated with aquatic plant systems, or as a method of water resource management, is critical to control or mediate the potential buildup of excessive biomass and the potential leaching of stored nutrients.

*Eichhornia Crassipes Solms,* or water hyacinth, is a bulbous plant of the family Pontederiaceae and is native to the South America. In the United States water hyacinths can be found in warmer regions such as Florida and other southeastern states. The plant grows on water with roots that extend only slightly below the surface of the water. Consequently, hyacinths float free in fresh water lakes, rivers, and canals. The difficulty with water hyacinths, whether cultivated or "naturally occurring" is twofold: first, they grow in extremely dense patches; second, under ideal growing conditions, they rapidly reproduce. Water hyacinth densities can reach 40 to 150 wet tons per acre. In terms of growth rate, the area covered by hyacinths can double every 20 days. Each of these factors may result in ecological and economic harm to regions in which hyacinths grow and can pose difficulties in management of hyacinths as a cultivatable crop. The difficulty in dealing with water hyacinths has been recognized for a long time. The need to control these plants was first acknowledged at the turn of the century, and is documented at: www.saj.usace.army.mil/conops/apc/new_folder/timeline.htm. Thus, there has been a long felt need for improved water hyacinth management.

Nonetheless, water hyacinths are proven to have some commercial benefits. For example, water hyacinths can be grown within aquaculture systems or non point or point source treatment systems to remove or reduce organic and nutrient pollutants. Additionally, water hyacinths can be processed into animal fodder or fertilizer. For these reasons, water hyacinths are often commercially grown and harvested. See for example U.S. Pat. Nos. 5,811,007 and 5,820,759 the disclosures of which are incorporated herein in their entirety by reference.

Whether naturally occurring or grown commercially, there have been a variety of devices designed for the removal and harvesting of water hyacinths. For example, U.S. Pat. No. 4,520,616 to Stewart et al. discloses a water craft with rotatable drums that permit the craft to float on the surface of the water. The drums support ribs which condition plant materials. Plants are directed onto a conveyor by way of a rope which is paid out from a reel on the craft.

U.S. Pat. No. 4,258,534 to Bryant illustrates a harvesting barge with converging booms which form a throat into which plant material is collected. The barge also includes discharge nozzles for inducing flow into the throat and onto a pick up conveyor.

Similarly, U.S. Pat. No. 5,487,258 to McNabb illustrates a barge onto which floating hyacinth material is conveyed. The barge also includes a grinder for chopping the hyacinth material into a size suitable for bailing. Thereafter, hyacinth material is bailed and passed to shore.

Furthermore, U.S. Pat. No. 5,603,204 to Harvey-Rioux et al. discloses a shredding head which is carried upon a flotation platform. The shredding head, which is suspended by a hanger from a boom, includes a rotor assembly for shredding vegetation.

Finally, U.S. Pat. No. 4,638,621 to Stewart, III et al. discloses a shore mounted harvesting apparatus which is adapted to gather plant material from the surface of water. The apparatus includes a series of rotating drums which are used in serrating and shredding the plant material. The shredded material is thereafter transferred to a chopping assembly that comminutes the plants into very small pieces.

Although each of the above described devices achieves its individual objective, none of them disclose the use of two vehicles working in tandem to collect, transport, and process water hyacinth material. Nor do the above described devices disclose a header mechanism capable of conveying aquatic plants to a conventional forage harvester.

Therefore, it is an object of this invention to provide an improvement which overcomes the inadequacies of the prior art devices and provides an improvement to water plant collection devices which is a significant contribution to the advancement of the art.

Another object of this invention is to provide a system whereby water plants, such as hyacinths, can be easily and completely harvested for subsequent transport and disintegration.

It is another object of the present invention to enable large quantities of water plants to be removed with a minimum amount of machinery or user intervention.

Another object of the present invention is to provide an articulated grapple which is adapted for removing plant material from the surface of water.

Still yet another objection of the present invention is to create a system whereby two vehicles, working in tandem, collect, transport, and disintegrate water plant materials.

Yet another object of the present invention is to enable materials to be quickly and efficiently transported between two collection vehicles by way of a water flume.

Still yet another object of the present invention is to enable a conventional forage harvester to be utilized in disintegrating plant materials.

Another object of the present invention is to process plant materials in a header such that the processed plant materials can be subsequently disintegrated by a conventional forage harvester.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention are provided with reference to the detailed description of the preferred embodiment in addition to the scope of the invention defined by the claims taken in conjunction with the accompanying drawings.

SUMMARY OF THE INVENTION

For the purpose of summarizing this invention, the invention comprises a system for gathering and processing materials and, in particular, plant materials such as water hyacinths. The system utilizes both a transfer mechanism and a header unit. The transfer mechanism includes a rotatable boom. A grapple is positioned at a first end of the boom for use in gathering plant material. The header unit similarly includes a boom. The boom of the header unit is rotatably interconnected to a collection bin and includes a grapple at one end. The collection bin, in turn, includes means to transport plant material placed therein to a chopper. The system further includes a transport which runs along side of the transfer mechanism and header unit. The transfer mechanism grapple functioning to place collected material onto the transport for delivery to the header unit grapple. Thereafter, the header unit grapple gathers the plant material and places it in the collection bin for transport.

The grapples utilized by the system of the present invention are of identical construction. They include a pair of gathering arms having distal and proximal ends. The proximal ends are pivotally interconnected to one another, with the angular orientation of the arms being adjustable. Each of the grapples is adapted to be interconnected to a boom. Each grapple further includes a ram that is pivotally interconnected between the gathering arms. Movement of the ram causes rotation of the gathering arms. Furthermore, the ram has a fully extended orientation wherein the grapple is in an opened orientation and a fully retracted orientation wherein the grapple is in a closed orientation. The construction of the grapples makes them ideally suited for collecting water plants.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to an apparatus and method for removing water hyacinths. The system of the present invention utilizes a transfer mechanism and grapple to collect hyacinth material from a body of water. The collected material is then passed to a transport for delivery to a header unit and grapple. The header unit grapple then retrieves the hyacinth material and delivers it to a collection bin for processing and delivery to a chopper, preferably a conventional forage chopper. The various features of the apparatus and method of the present invention are elaborated upon more fully hereinafter.

Plant Harvesting System

Figure 1:
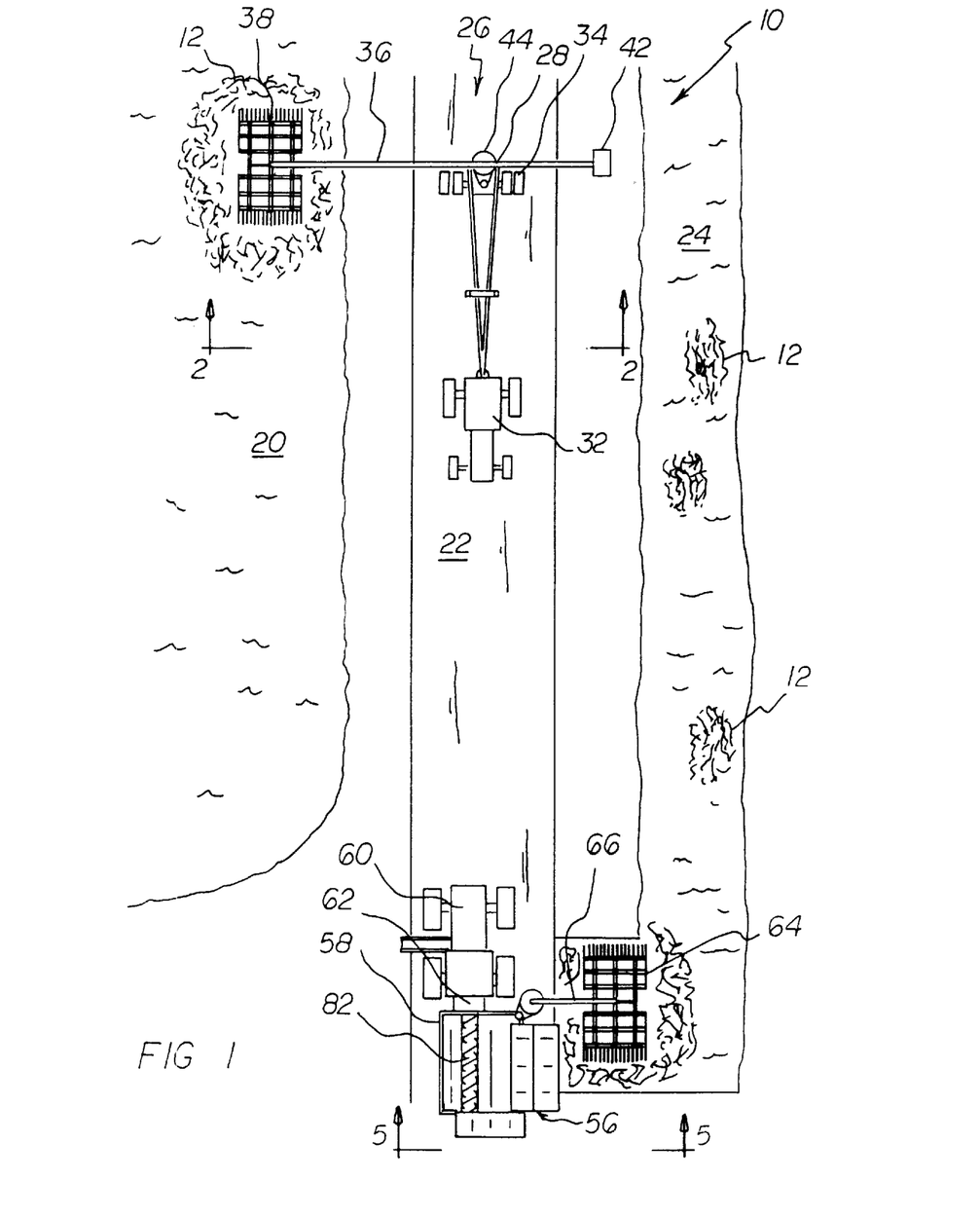
FIG. 1 is a plan view of the harvesting system of the present invention.

With reference to FIG. 1, the overall system 10 of the present invention is illustrated. The system 10 is ideally suited for use along a body of water 20, such as a lake, pond, canal, river, or other body of water subject to the growth of water plants, such. as water hyacinths 12. A passageway 22 is ideally formed adjacent to the body of water 20. This passageway 22 can take any number of forms, such as a paved or dirt road, the only requirement being that it be sufficient to allow for the movement of vehicles. As is illustrated, the passageway 22 is formed sufficiently close to the bank of the water 20 to permit the collection of plant material 12 by vehicles travelling along the road 22. The manner in which this collection is carried out will be described in greater detail hereinafter.

In addition to the roadway 22, the system 10 of the present invention preferably utilizes a transport mechanism 24. The transport mechanism 24 is formed parallel to the roadway 22, on a side opposite that of the body of water 20. In other words, as is evident from FIG. 1, the roadway 22 is positioned between the body of water 20 and transport mechanism 24, with the roadway 22 running parallel to both the transport mechanism 24 and the bank of the body of water 20. In the preferred embodiment, the transport mechanism 24 takes the form of a water flume, with the running water serving to transport deposited plant material from an upstream location to a downstream location. Other types of transport mechanisms 24 are within the scope of the present invention. For example, a mechanical conveyor belt can be employed in transporting plant material, or an additional vehicle could be employed. The only requirement of the transport mechanism 24 being that it delivers collected plant material from the transfer mechanism to the header unit. The system of the present invention can also be employed without a transfer mechanism, as is described more fully hereinafter. The roadway 22 of the present invention could take the form of a waterway. In such an embodiment, the vehicles traveling upon the roadway would take the form of water craft.

With continuing reference to FIG. 1, the two vehicles employed by the system of the present invention are illustrated. One of the vehicles positioned upon the roadway 22 is a transfer mechanism 26. In the preferred embodiment, this transfer mechanism 26 takes the form of a transfer trailer 28 that is coupled to, and transported by, a tractor 32. The tractor 32 can be of a conventional construction, with its purpose being to pull the transfer trailer 28 along the roadway 22 and possibly to provide a power take off (PTO) for driving a hydraulic power unit. The transfer trailer 28 is coupled to the tractor 32 by a conventional ball hitch, although any other interconnection between the trailer 28 and tractor 32 is within the scope of the present invention.

The transfer trailer 28 utilizes two or more wheels 34 at its rearward end to facilitate movement of the trailer. A boom 36 is also interconnected to a rearward extent of the trailer 28. As is illustrated, the boom 36 has a first end supporting a grapple mechanism 38 and a second weighted end 42 for counter balancing. The boom 36, and associated grapple 38, are capable of both pivoting and rotating relative to the trailer 28 to enable the collection of plant materials. Rotation is achieved by way of a chain and sprocket drive 44. More specifically, the boom 36 is mounted upon an enlarged sprocket 46 which receives rotational power from a smaller powered sprocket 48. A chain 52 engages both sprockets and serves in transferring rotational power from the powered socket 48. The powered socket 48 is preferably hydraulically driven. Pivoting of the boom 36 is also achieved by hydraulic power, preferably from the same fluid circuit. Specifically, a hydraulic piston assembly 54 is positioned intermediate the weighted end 42 of the boom 36 and the rearward extent of the trailer 28. The counterweight 42 of the boom positions the boom 36 in an upright elevated orientation. Subsequent extension of the hydraulic piston 54 forces the boom downwardly. The grapple 38, which is described more fully hereinafter, is positioned at the opposite end of the boom.

With reference to FIG. 1, the other major feature of the harvesting system 10 is the header unit 56. This unit 56 consists of a collection bin 58, or container, and a header grapple 64. A tractor 60 and forage chopper are adapted for interconnection with the header unit 56. The tractor 60 can employ a power source, such as a power take off (PTO) or electricity to drive a hydraulic power unit. In the preferred embodiment, the forage chopper takes the form of a conventional forage harvester. Preferably, the harvester 62 forms part of the tractor 60, taking the form of a self propelled forage harvester. Furthermore, the harvester 62 and header unit 56 are interconnected to permit the header unit 56 to be transported by the harvester 62. Namely, the harvester 62 is equipped with hydraulics to pick up the header unit 56. Thus, the harvester 62 and header 56 can act as a stand alone harvesting device. Consequently, if a transport mechanism 24 is not present, the harvester 62 and header 56 and be transported as a unit to gather water plant material by way of the header grapple 64. Alternatively, if a transport mechanism 24 is present, the harvester 62 and header 56 can remain stationary, or the harvester 62 can be separate from the header 56.

Figure 5:
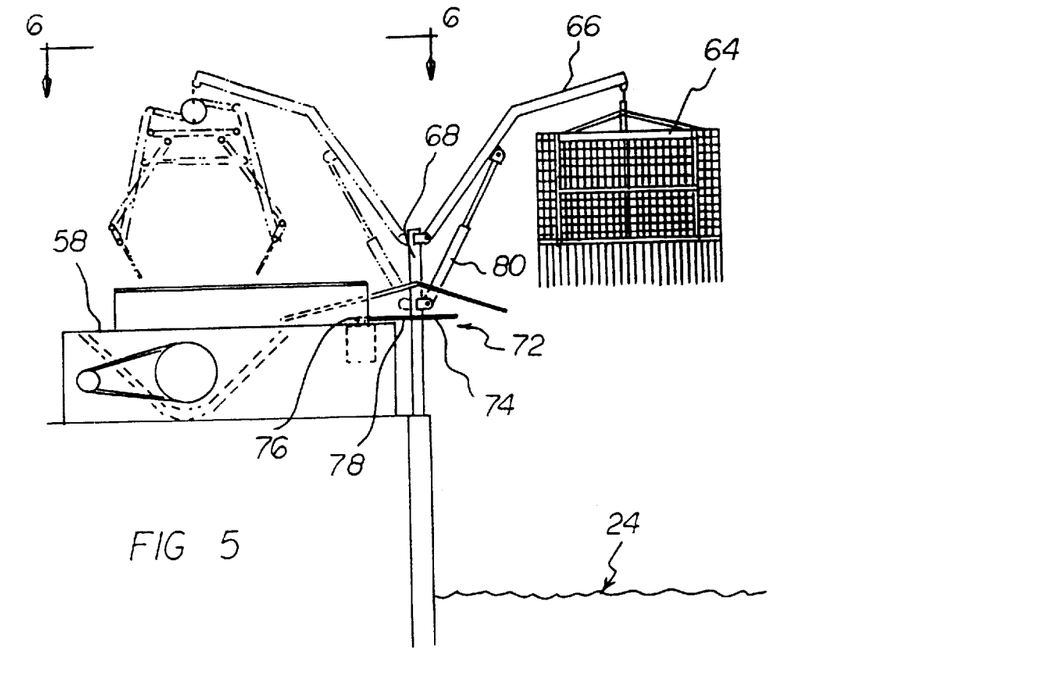
FIG. 5 is a side elevational view of the collection bin with the interconnected boom and grapple as taken from line 5—5 of FIG. 1.

The header grapple 64, which is described in fuller detail hereinafter, is positioned at the end of a boom 66 . As illustrated in FIG. 5, the boom 66 is capable of pivoting and rotating relative to the collection bin 58. More specifically, the boom 66 is pivotally coupled to a mounting post 68. The mounting post 68, in turn, is rotatably interconnected to the collection bin 58 by way of a chain and sprocket drive 72. Namely, the mounting post 68 is secured to an enlarged sprocket 74. The enlarged sprocket 74, in turn, is coupled to a powered drive sprocket 76 by way of a chain drive 78. Rotation of the enlarged sprocket 74 rotates the mounting post 68, as well as the boom 66. Again, hydraulic fluid is the preferred power source for the drive sprocket 76. Pivoting of the boom 66 is achieved by a hydraulic piston 80 which is interconnected between the boom 66 and mounting post 68. As can be appreciated from FIG. 5, the boom 66, mounting post 68, and piston 80 effectively form a three bar linkage. As can further be appreciated, extension of the hydraulic piston 80 results in the raising of the boom 66. Conversely, retraction of the piston 80 results in a lowering of the boom 66.

Figure 6:
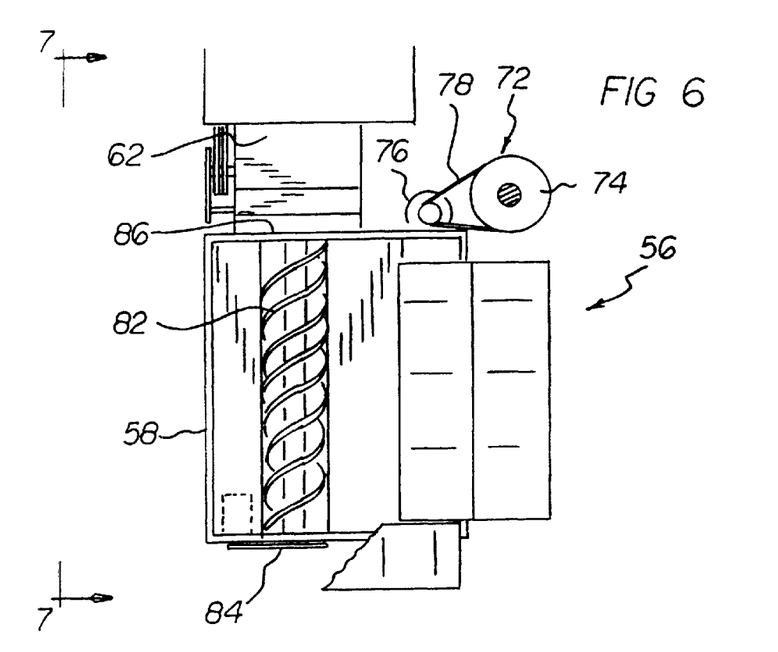
FIG. 6 is a top plan view of the collection bin and auger taken from line 6—6 of FIG. 5.
Figure 7:
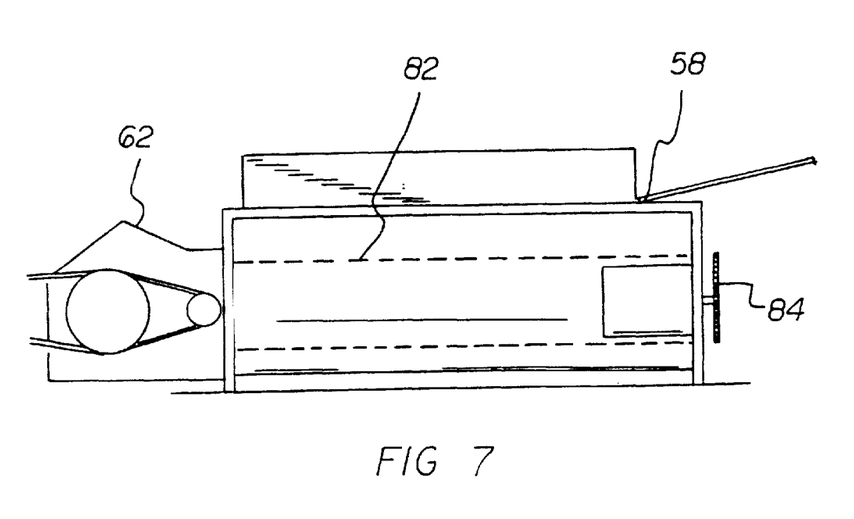
FIG. 7 is a side elevational view of the collection bin taken along line 7—7 of FIG. 6.
Figure 8:
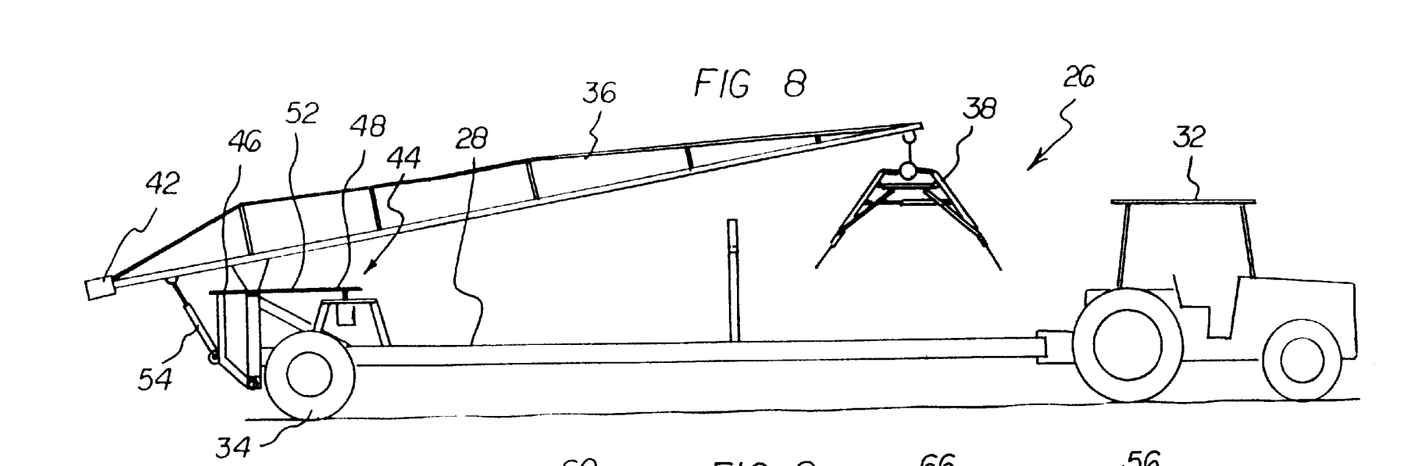
FIG. 8 is a side elevational view of the transfer trailer and tractor.
Figure 9:
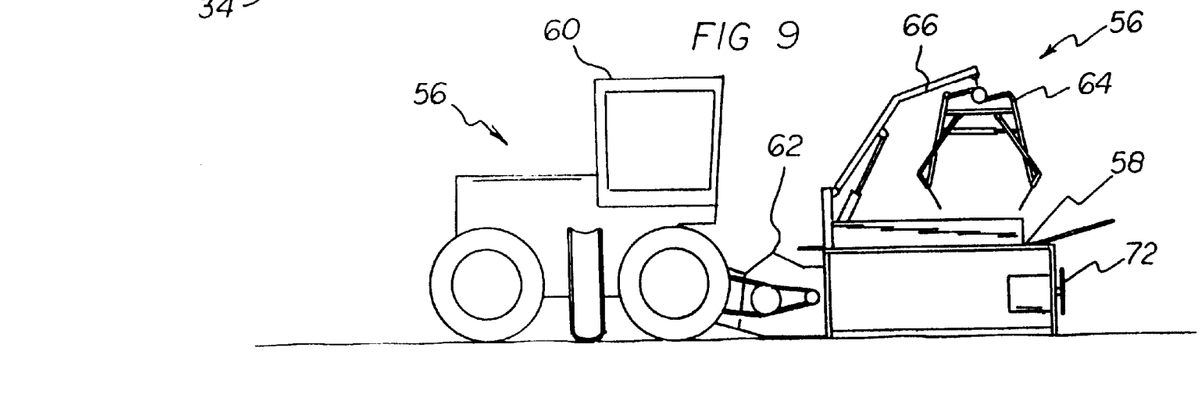
FIG. 9 is a side elevational view of the header unit and tractor.

With reference to FIGS. 6 and 7, the collection bin 58 of the present invention will be described. Namely, FIG. 5 illustrates the auger 82 that is rotatably positioned within the collection bin 58. In the preferred embodiment, the auger 82 is preferably hydraulically powered by way of a chain and sprocket drive 84. The auger 82 functions in transporting plant material placed within the collection bin 58. Furthermore, the auger 82 gathers the plant materials into a form suitable for subsequent disintegration by the harvester 62. Namely, plant material placed within the bin 58 is transported, by rotation of auger 82, through the outlet 86 of the collection bin 58 and into the harvester 62 for disintegration. Only after the plant material has been processed by the auger 82 is it in a form suitable for delivery to the harvester 62. Specifically, the processed material is first delivered to feed rollers within the harvester and subsequently to cutting knives also located within the harvester. Without previous processing of the plant material by the auger 82, subsequent disintegration by harvester 62 would be ineffective. Although harvester 62 has been described as disintegrating the plant material, it is understood that the harvester 62 could be employed in chopping or otherwise comminuting the plant material. Furthermore, although the header. 56 has been described as employing an auger 82, other conveyances are within the scope of the present invention. The only requirement of the conveyance is that it is capable of transporting material placed within the bin 58 and processing it into a form suitable for subsequent disintegration by harvester 62.

In accordance with the flow of water within the flume, tractor 60 with its interconnected header unit 56 is deemed the downstream tractor, while the tractor 32 of the transfer mechanism 26 is deemed the upstream tractor. The forage harvester 62 employed by the system 10 of the present invention is of a conventional construction. Thus, any chopping mechanism that is sufficiently robust to fully disintegrate, or chop, plant materials, such as water hyacinths can be employed. Nonetheless, in the preferred embodiment a conventional forage harvester is employed, such as a John Deere forage harvester, with any of the following John Deere models being sufficient to meet the demands of the present invention: 5200; 5400; 5440; 5460; 5720; 5820; 5730; or 5830. With reference to FIG. 7, the interconnection between the collection bin 58 and harvester 62 is depicted. Specifically, the inlet of the harvester 62 is coupled with the outlet 86 of the collection bin 58 and auger 82. Consequently, material placed within the bin 58 is transported by the auger 82 to the outlet 86 of the bin 58. Thereafter, the plant material is delivered to the harvester 62 for disintegration. Once fully disintegrated, the plant material is dispensed to the side of the tractor 60 for subsequent use.

Thus, in operation, the transfer trailer grapple 38 is maneuvered over the plant material 12 within the body of water 20. This is primarily accomplished by way of the boom's rotational control. Thereafter, the boom 36 is pivoted downwardly into the water such that the grapple 38 extends below the root line of the plant 12. Thereafter, the grapple 38 is closed and the plant material 12 is collected. The collected plant material is then transported to the opposite side of the transfer mechanism 26. Again, this is accomplished by way of the rotational and pivotal boom controls. Here, the grapple 38 is again operated such as to release the collected plant material into the flume. Thereafter, the plant material 12 travels, by virtue of the water flow within the flume, to a downstream collection area adjacent to the header unit 56. Next, the header unit grapple 64 functions to gather the hyacinth material and place it in the collection bin 58 for transport by the auger 82 and disintegration by the harvester 62.

Grapple Mechanisms

Figure 2:
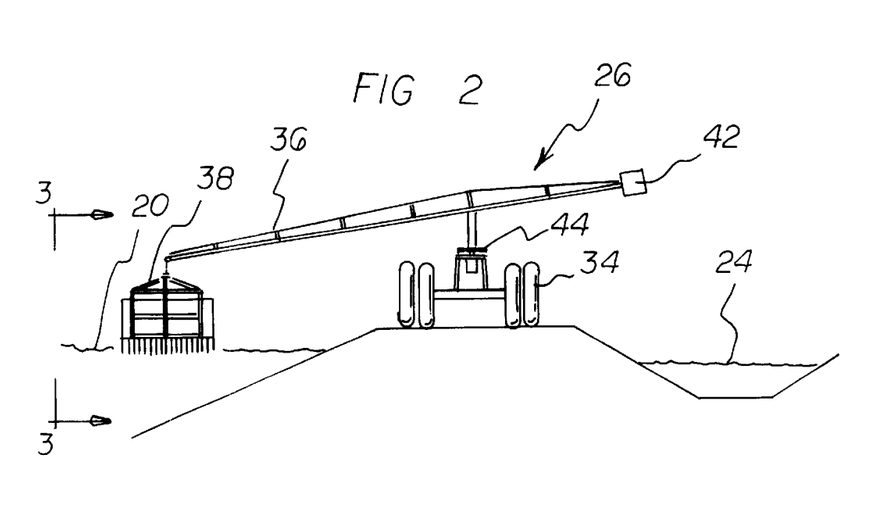
FIG. 2 is a rear elevational view of the transfer mechanism collecting plant materials from a body of water.
Figure 3:
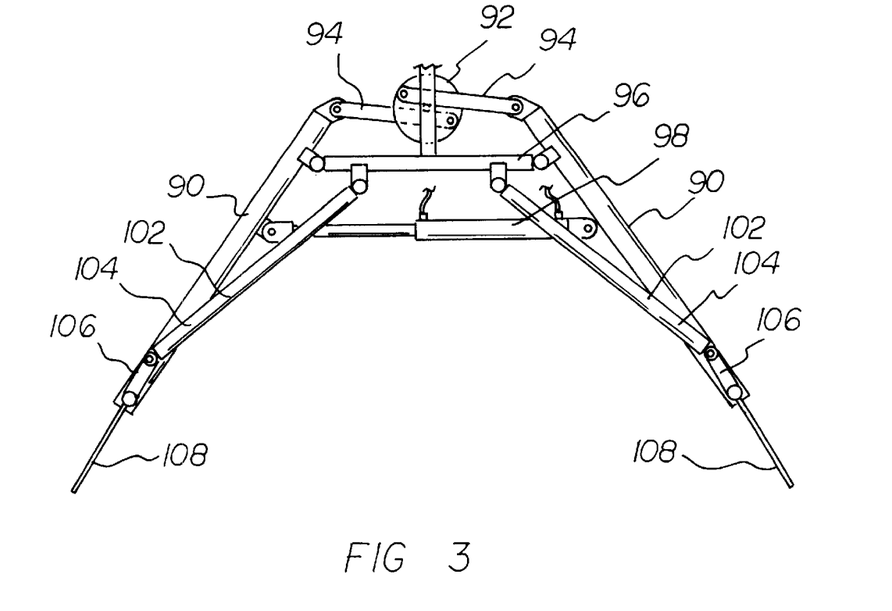
FIG. 3 is a detailed view of one of the grapples in the opened orientation as taken from line 3—3 of FIG. 2.
Figure 4:
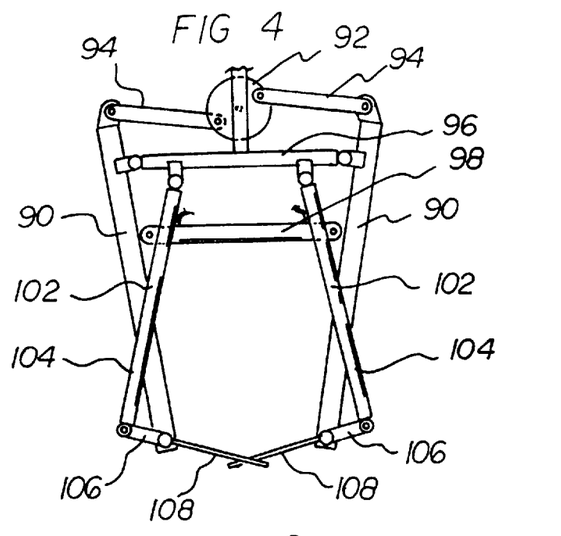
FIG. 4 is a detailed view of one of the grapples in the closed orientation.

The articulated grapple mechanisms (38 and 64) of the present invention are next described in conjunction with FIGS. 3 and 4. The grapple mechanism of the transfer mechanism and header unit (38 and 64) are of an identical construction. Consequently, only one grapple mechanism will be described in detail. The two primary components of the grapple are the pair of gathering arms 90. Each arm 90 is defined by distal and proximal ends. The proximal ends of the arms are pivotally interconnected to one another. More specifically, the proximal ends are each pivotally connected to an indexing wheel 92 via an indexing link 94. As can be appreciated from a comparison of FIGS. 3 and 4, rotation of the indexing wheel 92 varies the horizontal distance between the arms 90, and varies the angular orientation of the arms 90. Additionally, the indexing wheel 92 is adapted to be interconnected to a boom by way of a cable, note FIG. 2.

The grapple also preferably includes a cross brace 96. The cross brace 96 is pivotally interconnected between the proximal ends of the gathering arms 90 and serves to stabilize the entire grapple structure. The grapple is powered by a hydraulic ram or piston 98 positioned immediately below the cross brace 96. More specifically, the ram 98 has its opposing ends pivotally interconnected between the gathering arms 90. Linear movement of the ram 98 causes rotation of the indexing wheel 92 and rotation of the gathering arms 90. Furthermore, the ram 98 has a fully extended orientation wherein the grapple is in an open orientation (note FIG. 3) and a fully retracted orientation wherein the grapple is in a closed orientation (note FIG. 4).

Figure 10:
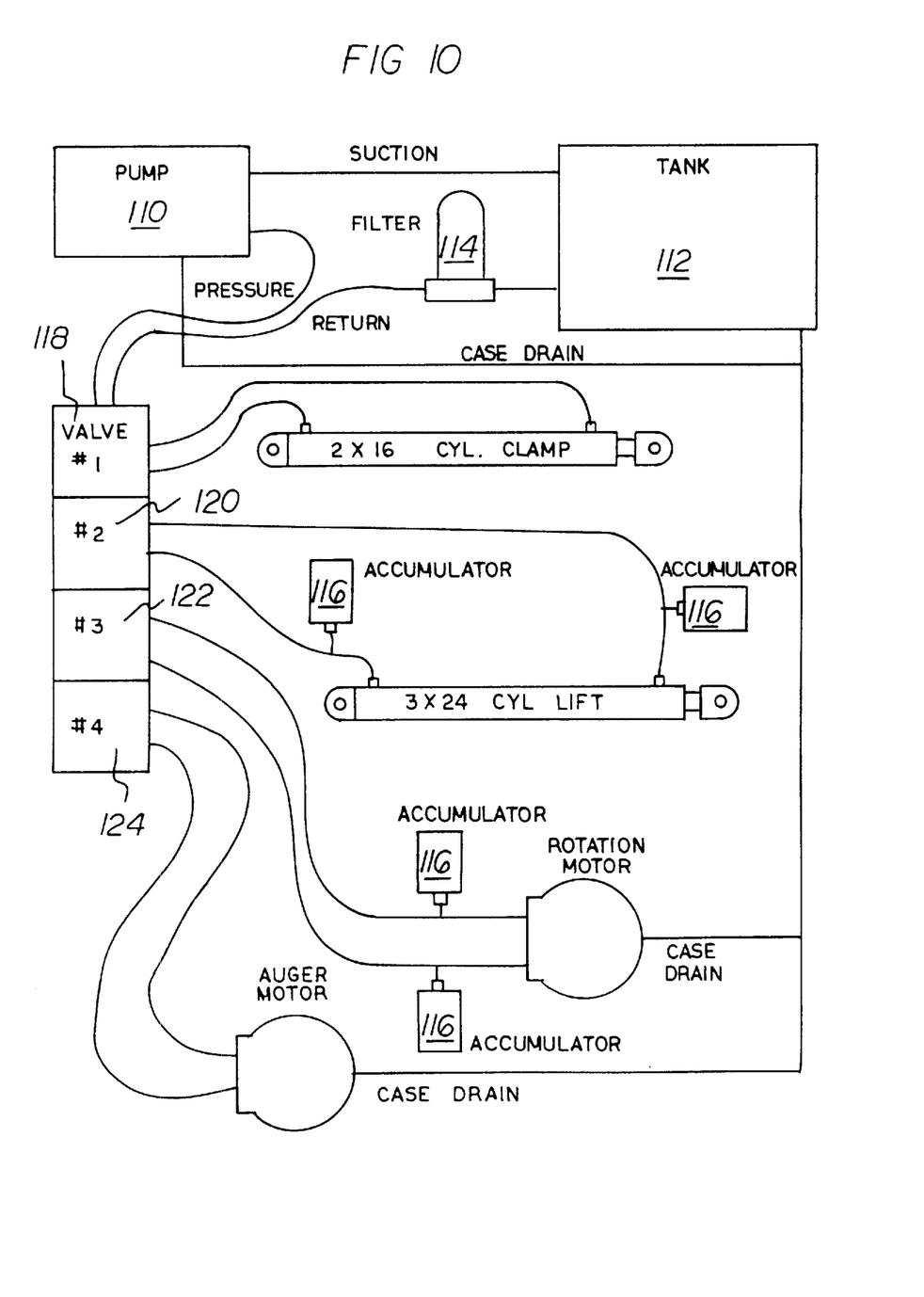
FIG. 10 is a schematic illustrating the hydraulic circuit employed by the header unit.

Additional components of the grapple include the tine linkages 102 and tines 108. Each tine linkage 102 comprises major and minor links (104 and 106 respectively) which are pivotally interconnected. Each linkage is pivotally interconnected between the cross brace 96 and the distal end of one of the gathering arms 90. The tine linkages 102 further include a set of tines 108 positioned at an outer end of each minor linkage 106. These tines 108 are ideally suited for removing water plants from water. Furthermore, each tine linkage 102 is capable of pivoting such that the opposing tines 108 are enmeshed when the grapple is in the closed orientation (note FIG. 4) and in alignment with the gathering arms 90 when in the opened orientation (note FIG. 3). Preferably, each grapple is powered from the hydraulic circuit powering the rotational and pivotal boom controls. For example, FIG. 10 is a schematic illustrating the hydraulic circuit of the header unit 56. The circuit includes a pump 110 and tank 112 for the supply and delivery of hydraulic fluid. The circuit also employs a hydraulic filter 114 and accumulators 116 as necessary. As is evident from the diagram, the grapple ram 118, pivotal control 120, rotational control 122, and auger control 124, are all operated off the same hydraulic circuit. The entire hydraulic circuit is driven from a source of electricity or a power take off on the harvester.

Harvesting Method

The method associated with the system of the present invention is described next. The method incorporates the following steps. First, plant material is collected at a first location by way of the transfer trailer, boom, and grapple. Next, the boom is rotated to bring the transfer grapple to a second location overlying the water flume. Then the collected hyacinth material is deposited into the flume for transport to a collection site. Once at the site, the hyacinth material is collected by way of the header grapple and rotatable boom. Thereafter, the boom, and header grapple, is rotated to a position overlying the collection bin and auger. Next, the retrieved hyacinth material is then deposited into the bin for transport by the auger. Lastly, the hyacinth material is passed from the auger into the forage harvester for disintegration.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention. Now that the invention has been described,

What is claimed is:

1. A system for collecting, transporting, and disintegrating water hyacinths, the system comprising:

a transfer trailer coupled to and transported by an upstream tractor, a boom having first and second ends rotatably interconnected to the transfer trailer by way of a chain and sprocket drive, the boom having a grapple at the first end and a weight at the second end;

a header unit having a boom rotatably interconnected to a collection bin by way of a chain and sprocket drive, the boom having a grapple at one end, an auger rotatably positioned within the collection bin for transporting hyacinth material placed therein and processing the hyacinth material into a form suitable for subsequent disintegration, the auger being driven by a chain and sprocket drive, a forage harvester which forms part of a downstream tractor, the harvester having an inlet coupled with an outlet of the collection bin and auger, the harvester functioning to disintegrate processed water hyacinth material passed into the inlet;

a water flume running along side of the transfer trailer and header unit, the transfer trailer grapple functioning to place collected hyacinth material into the flume for transport to the header unit grapple, thereafter the header unit grapple functioning to gather the hyacinth material and place it in the collection bin for transport by the auger and disintegration by the harvester.

2. A method for collecting, transporting, and disintegrating water hyacinth material, the method comprising the following steps:

collecting hyacinth material at a first location by way of a transfer grapple coupled to a rotatable boom;

rotating the boom and transfer grapple to a second location overlying a water flume;

depositing the collected hyacinth material into the flume for transport to a collection site;

retrieving the hyacinth material from the collection site by way of a header grapple coupled to a rotatable boom;

rotating the boom and header grapple to a position overlying a collection bin and auger;

depositing the retrieved hyacinth material into the bin for transport by the auger;

passing the hyacinth material from the auger into a forage harvester for disintegration.

* * * * *